(12) United States Patent
Ishikawa et al.

(10) Patent No.: US 12,452,623 B2
(45) Date of Patent: Oct. 21, 2025

(54) INFORMATION PROCESSING METHOD, INFORMATION PROCESSING DEVICE, AND RECORDING MEDIUM

(71) Applicant: Panasonic Intellectual Property Corporation of America, Torrance, CA (US)

(72) Inventors: Tomokazu Ishikawa, Osaka (JP); Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 218 days.

(21) Appl. No.: 18/372,793

(22) Filed: Sep. 26, 2023

(65) Prior Publication Data

US 2024/0015461 A1 Jan. 11, 2024

Related U.S. Application Data

(63) Continuation of application No. PCT/JP2022/017167, filed on Apr. 6, 2022.
(Continued)

(30) Foreign Application Priority Data

Mar. 29, 2022 (JP) ................................ 2022-054455

(51) Int. Cl.
*H04S 7/00* (2006.01)
*G06F 3/01* (2006.01)

(52) U.S. Cl.
CPC .............. *H04S 7/303* (2013.01); *G06F 3/012* (2013.01)

(58) Field of Classification Search
CPC .......... H04S 7/303; H04S 7/304; H04S 7/305; H04S 7/306; G06F 3/012
(Continued)

(56) References Cited

U.S. PATENT DOCUMENTS 7,027,600 B1 4/2006 Kaji et al.
2023/0179946 A1* 6/2023 Okimoto ................ G10K 15/12
381/63

FOREIGN PATENT DOCUMENTS

EP 3276982 A1 * 1/2018 ............ H04S 7/304
JP 2006-128818 5/2006
WO 2020/231884 11/2020

OTHER PUBLICATIONS

Extended European Search Report issued Sep. 18, 2024 in European Patent Application No. 22788106.7.
(Continued)

*Primary Examiner* — David L Ton (57) ABSTRACT

An information processing method includes: obtaining sound information that includes (i) a first audio signal and (ii) space information that is information for reproducing a virtual space and includes first data relating to a first structure disposed in the virtual space, the virtual space including the first structure and a sound source; generating second data based on the first data, each of the first data and the second data being associated with a position in the virtual space, the second data being data having a smaller amount of data than the first data; calculating a propagation distance of sound from the sound source, the sound being reflected at the position associated with the second data and arriving at a position of a listener; and generating a second audio signal subjected to stereoacoustic processing, using the first audio signal and the propagation distance.

14 Claims, 4 Drawing Sheets

Related U.S. Application Data (60) Provisional application No. 63/173,609, filed on Apr. 12, 2021.

(58) Field of Classification Search
USPC .................................................. 381/303, 310
See application file for complete search history.

(56) References Cited

OTHER PUBLICATIONS

International Search Report issued Jun. 21, 2022 in International (PCT) Application No. PCT/JP2022/017167.

\* cited by examiner

| Three-dimensional shape | Weight |
|---|---|
| Cube | w1 |
| Cylinder | w2 |
| Sphere | w3 |
| Cone | w4 |

INFORMATION PROCESSING METHOD, INFORMATION PROCESSING DEVICE, AND RECORDING MEDIUM

CROSS REFERENCE TO RELATED APPLICATIONS

This is a continuation application of PCT International Application No. PCT/JP2022/017167 filed on Apr. 6, 2022, designating the United States of America, which is based on and claims priority of U.S. Provisional Patent Application No. 63/173,609 filed on Apr. 12, 2021, and Japanese Patent Application No. 2022-054455 filed on Mar. 29, 2022. The entire disclosures of the above-identified applications, including the specifications, drawings and claims are incorporated herein by reference in their entirety.

FIELD

The present disclosure relates to an information processing method, an information processing device, and a recording medium for reproducing stereoacoustic sound.

BACKGROUND

There is known a sound reproduction technology, as disclosed in Patent Literature (PTL) 1, for enhancing the presence of a sound object and the reality of a virtual environment, when sound is reproduced in a virtual space in which the transfer characteristics of a space are simulated by virtual reality (VR) or augmented reality (AR) etc., using an impulse response that is provided in accordance with the shape of the space.

CITATION LIST

Patent Literature

[PTL 1] Japanese Unexamined Patent Application Publication No. 2006-128818

SUMMARY

Technical Problem

However, the reproduction of stereoacoustic sound involves significant load on sound reproduction processing. Also, when a change occurs in, for example, the position of a sound source, the position of a listener, the spatial structure of a space for reproduction, it is necessary to perform computation in accordance with the position of the sound source, the position of the listener, the spatial structure of the space for reproduction that have changed. This requires a significant processing load.

In view of this, the present disclosure provides an information processing method and so forth that are capable of reducing processing load that is required in the reproduction of stereoacoustic sound.

Solution to Problem

The information processing method according to an aspect of the present disclosure includes: obtaining sound information that includes (i) a first audio signal and (ii) space information that is information for reproducing a virtual space and includes first data relating to a first structure disposed in the virtual space, the virtual space including the first structure and a sound source; generating second data based on the first data, each of the first data and the second data being associated with a position in the virtual space, the second data being data having a smaller amount of data than the first data; calculating a propagation distance of sound from the sound source, the sound being reflected at the position associated with the second data and arriving at a position of a listener; and generating a second audio signal subjected to stereoacoustic processing, using the first audio signal and the propagation distance.

Also, the information processing device according to an aspect of the present disclosure includes: a processor; and memory, wherein using the memory, the processor: obtains sound information that includes (i) a first audio signal and (ii) space information that is information for reproducing a virtual space and includes first data relating to a first structure disposed in the virtual space, the virtual space including the first structure and a sound source; generates second data based on the first data, each of the first data and the second data being associated with a position in the virtual space, the second data being data having a smaller amount of data than the first data; calculates a propagation distance of sound from the sound source, the sound being reflected at the position associated with the second data and arriving at a position of a listener; and generates a second audio signal subjected to stereoacoustic processing, using the first audio signal and the propagation distance.

Note that these general or specific aspects may be implemented in the form of a system, a method, an integrated circuit, a computer program, or a non-transitory recording medium such as a computer-readable CD-ROM. These general and specific aspects may also be implemented using any combination of systems, methods, integrated circuits, computer programs, or non-transitory recording media.

Advantageous Effects

The information processing method and so forth according to the present disclosure are capable of reducing processing load that is required in the reproduction of stereoacoustic sound.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT (Underlying Knowledge Forming Basis of the Present Disclosure)

Examples of the known sound reproduction technologies include a scheme that is based on the wave acoustic theory, such as a boundary element method, for faithful reproduction of physical properties as disclosed in PTL 1, and a method that is based on geometric acoustics such as an acoustic ray method. The scheme based on the wave acoustic theory has a problem that the amount of computation increases in computing an impulse response for a complex spatial shape, especially at high frequencies. Also, the use of the method based on geometric acoustics, such as an acoustic ray method, results in a problem that a sound object moves and the amount of calculation increases in real time in a six degrees of freedom (6DoF) environment in which a user moves.

The information processing method according to an aspect of the present disclosure includes: obtaining space information for reproducing a virtual space including a first structure and a sound source that are located in the virtual space; generating a plurality of second structures, each having a simplified shape for simplifying a shape of the first structure, the simplified shape of each of the plurality of second structures having a shape formed of a combination of one or more types of a plurality of predetermined simple three-dimensional shapes; calculating a reflection index value of each of the plurality of second structures to calculate a plurality of reflection index values that correspond one to one to the plurality of second structures, each of the reflection index values relating to a sound reflection efficiency of a corresponding one of the plurality of second structures; selecting one of the plurality of second structures, based on the plurality of reflection index values; and replacing the first structure with the one of the plurality of second structures that is selected to generate a simplified space in which a three-dimensional shape of the first structure is simplified.

With this, the first structure located in the virtual space is replaced by one of the plurality of second structures that is selected on the basis of the reflection index values of the plurality of second structures that are generated by simplifying the shape of the first structure. This makes it possible to replace the first structure with the second structure having similar sound affecting properties and having a simplified shape. Consequently, it is possible to obtain a simplified space that involves a reduced amount of computation so that no change occurs in the sound affecting properties. This reduces the processing load on the reproduction of stereoacoustic sound.

Also, a listening position of a listener in the virtual space may further be identified. The generating of the plurality of second structures may include generating the plurality of second structures by combining the one or more types of the plurality of simple three-dimensional shapes to cause each of the plurality of second structures to match a projected area of the first structure in a plan view of the first structure seen from the listening position.

This makes it possible to generate a plurality of second structures having similar sound affecting properties to those of the first structure.

Also, each of the plurality of second structures may be generated to cause a sound reflection angle at each of three points relating to the second structure and a sound reflection angle at each of three points relating to the first structure to be equal to each other in a sound propagation path from the sound source to the listening position. Here, the three positions relating to the second structure are a barycenter position in a projected shape of the second structure in a plan view of the second structure seen from the listening position, and positions of two points that sandwich the barycenter position, and the three positions relating to the first structure are a barycenter position in a projected shape of the first structure in a plan view of the first structure seen from the listening position, and positions of two points that sandwich the barycenter position.

This makes it possible to generate a plurality of second structures having similar sound affecting properties to those of the first structure.

Also, the plurality of second structures may have mutually different shapes.

Also, the selecting of the one of the plurality of second structures may include selecting, as the one of the plurality of second structures, a second structure whose reflection index value is smallest among the reflection index values of the plurality of second structures.

This makes it possible to select, as one second structure, a structure that requires the smallest amount of computation among the plurality of second structures.

Also, a position and a posture of a head portion of a listener in the virtual space may further be identified. An arrival direction and a propagation distance of sound may be further calculated, based on the simplified space, the position and the posture of the head portion, and a position of the sound source. Here, the sound is at least one of sound that arrives at the head portion from the sound source or sound that arrives at the head portion after reflected at the one of the plurality of second structures in the simplified space, and the propagation distance is a distance through which the at least one sound arrives at the head portion. An audio signal may further be generated by convolving the arrival direction and the propagation distance of the at least one sound to a predetermined head-related transfer function. The audio signal generated may further be outputted.

With this, stereoacoustic processing is performed, using a simplified space that involves a reduced amount of computation so that no change occurs in the sound affecting properties. This reduces the processing load on the reproduction of stereoacoustic sound.

Also, the position and the posture of the head portion and the position of the sound source may be identified at a plurality of timings that are mutually different, and the calculating of the propagation distance, the generating of the audio signal, and the outputting of the audio signal may be performed at each of the plurality of timings.

With this, it is possible to reduce the processing load on the reproduction of stereoacoustic sound. This effectively reduces the processing load of the processing that is performed in real time.

Also, the information processing device according to an aspect of the present disclosure includes: a processor; and memory. Here, using the memory, the processor: obtains space information for reproducing a virtual space including a first structure and a sound source that are located in the virtual space; generates a plurality of second structures, each having a simplified shape for simplifying a shape of the first structure, the simplified shape of each of the plurality of second structures having a shape formed of a combination of one or more types of a plurality of predetermined simple three-dimensional shapes; calculates a reflection index value of each of the plurality of second structures to calculate a plurality of reflection index values that correspond one to one to the plurality of second structures, each of the reflection index values relating to a sound reflection efficiency of a corresponding one of the plurality of second structures; selects one of the plurality of second structures, based on the plurality of reflection index values; and replaces the first structure with the one of the plurality of second structures that is selected to generate a simplified space in which a three-dimensional shape of the first structure is simplified.

With this, the first structure located in the virtual space is replaced by one of the plurality of second structures that is selected on the basis of the reflection index values of the plurality of second structures that are generated by simplifying the shape of the first structure. This makes it possible to replace the first structure with a second structure having similar sound affecting properties and having a simplified shape. Consequently, it is possible to obtain a simplified space that involves a reduced amount of computation so that no change occurs in the sound affecting properties. This reduces the processing load on the reproduction of stereoacoustic sound.

Note that these general or specific aspects may be implemented in the form of a system, a method, an integrated circuit, a computer program, or a recording medium such as a computer-readable CD-ROM. These general and specific aspects may also be implemented using any combination of systems, methods, integrated circuits, computer programs, or recording media.

Hereinafter, a certain exemplary embodiment is described in greater detail with reference to the accompanying Drawings. The exemplary embodiment described below shows a general or specific example. Stated differently, the numerical values, shapes, materials, elements, the arrangement and connection of the elements, steps, the processing order of the steps etc. shown in the following exemplary embodiment are mere examples, and therefore do not limit the scope of the present disclosure. Also, among the elements in the following exemplary embodiment, those not recited in any one of the independent claims that show the most generic concept are not essential to achieve the object of the present disclosure, but are described as elements that form a more preferred embodiment.

Embodiment

1. Configuration

The following describes the system configuration according to the present disclosure.

Figure 1:
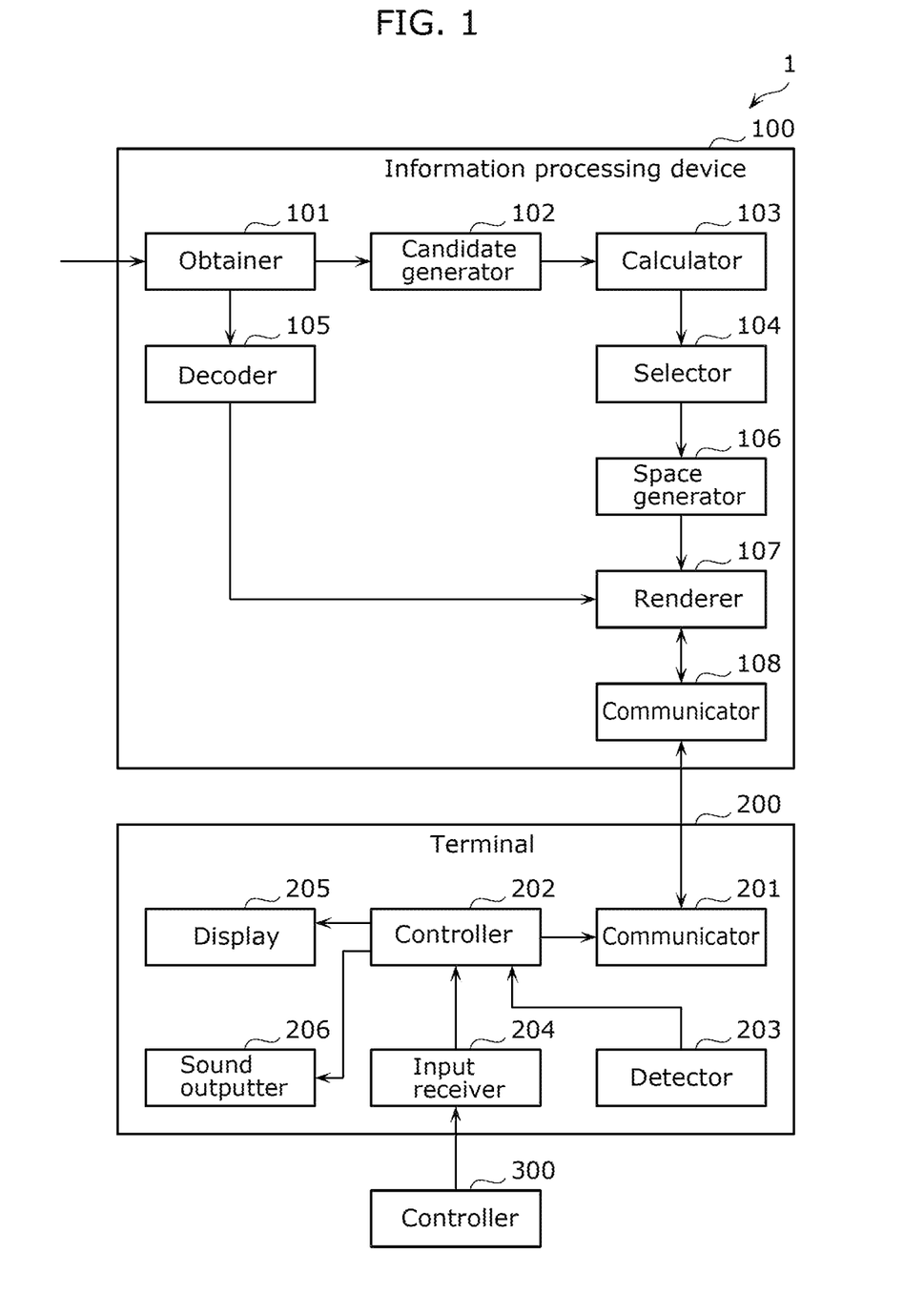
FIG. 1 is a diagram showing an example of a sound reproduction system according to an embodiment.

FIG. 1 is a diagram showing an example of the sound reproduction system according to an embodiment.

As shown in FIG. 1, sound reproduction system 1 according to the present embodiment includes, for example, information processing device 100, terminal 200, and controller 300. These may be connected, for example, to be able to communicate with each other through exclusive wired communication or wireless communication. These may also be connected to be able to directly communicate with each other or via a predetermined device interposed therebetween. Information processing device 100 reproduces sound in a virtual space and outputs the sound to terminal 200. Information processing device 100 reproduces the virtual space and reproduces sound that is audible to a user in the virtual space. The virtual space includes a structure, a sound source, a listener, and so forth. The listener is the user. These structure, sound source, and listener are virtual objects. Information processing device 100 reproduce sound that is audible to the listener in the virtual space, on the basis of the size and position of the structure, the position of the sound source, and the position of the listener in the virtual space. Terminal 200 outputs the generated sound to the user, and controller 300 obtains an input received from the user. The position and posture of the listener in the virtual space are changed in accordance with the input obtained by terminal 200. For this reason, information processing device 100 changes sound to be reproduced, in accordance with the position and posture of the listener in the virtual space that have been changed in accordance with the input obtained by terminal 200.

First, information processing device 100 will be described.

Information processing device 100 includes obtainer 101, candidate generator 102, calculator 103, selector 104, decoder 105, space generator 106, renderer 107, and communicator 108. Information processing device 100 can be implemented by a processor executing a predetermined program, using memory. Stated differently, information processing device 100 is a computer.

Obtainer 101 obtains sound information for reproducing sound in the virtual space. Obtainer 101 may obtain the sound information from an external storage device via a network or from an internal storage device. The storage device may be a device that reads information recorded in a recording medium such as an optical disc and a memory card, or may be a device that includes a recording medium, such as a hard disk drive (HDD) and a solid state drive (SSD), and reads information recorded in such recording medium. The external storage device may be, for example, a server connected via the Internet. Note that the sound information includes, for example, an audio stream that represents sound from the sound source and space information representing the virtual space.

The space information includes: mesh information for reproducing a first structure located in the virtual space; the sound source position; and so forth. The mesh information includes information on the structure, such as the size, the shape, the color, the reflectivity, and the reverberation properties. The structure includes an artificial structure and a natural structure. Stated differently, the structure includes all kinds of virtual objects for defining the space. The sound source position indicates the position in the structure at which sound is reproduced (outputted). The sound source position may change with the passage of time. Examples of the sound source include object-based, HOA-based, and channel-based sound source.

Candidate generator 102 generates a plurality of second structures, each having a simplified shape for simplifying the shape of the first structure. Each of the simplified shapes of the plurality of second structures has a shape formed of a combination of one or more types of a plurality of predetermined simple three-dimensional shapes. The plurality of simple three-dimensional shapes include, for example, cube, cylinder, sphere, and cone. Each of the second structures may be formed of, for example, a combination of one or more types among cube, cylinder, sphere, and cone, or a combination of two or more types among cube, cylinder, sphere, and cone, each being formed of at least one shape. The plurality of second structures have mutually different shapes.

Candidate generator 102 determines plural patterns of combining simplified shapes so that each of the second structures has a shape close to the shape of the first structure, thereby generating the plurality of second structures. More specifically, candidate generator 102 generates the plurality of second structures by combining one or more types of the simple three-dimensional shapes so that each of the second structures matches the projected area of a target first structure to be processed in a plan view of the target first structure seen from the listening position. Here, each of the plurality of second structures is generated in the following manner: in a sound propagation path from the sound source to the listening position, a sound reflection angle at each of three positions, that is, the barycenter position in the projected shape of the second structure in a plan view of the second structure seen from the listening position and the positions of the two points that sandwich such barycenter position, and a sound reflection angle at each of three positions, that is, the barycenter position in the projected shape of the first structure in a plan view of the first structure seen from the listening position and the positions of the two points that sandwich such barycenter position are equal with each other. When the mesh information of the space information includes a plurality of first structures, candidate generator 102 generates a plurality of second structures for each of the plurality of first structures.

Calculator 103 calculates, for each of the plurality of second structures generated by candidate generator 102, a reflection index value that relates to the sound reflection efficiency of the second structure. Through this, calculator 103 calculates a plurality of reflection index values that correspond one to one to the second structures. More specifically, calculator 103 calculates, as a reflection index value, a total sum of weights that are preliminarily associated with one or more types of the simple three-dimensional shapes that form each of the plurality of second structures. More specifically, a reflection index value is an index value to which a greater value is set as a predetermined sound from the sound source located in front is reflected more efficiently. To be reflected efficiently means, for example, that when a predetermined sound and a reflected sound are compared, the difference between their frequency characteristics is smaller. For example, a greater value is set as a reflection index value in descending order of cube, cylinder, sphere, and cone.

Figure 2:
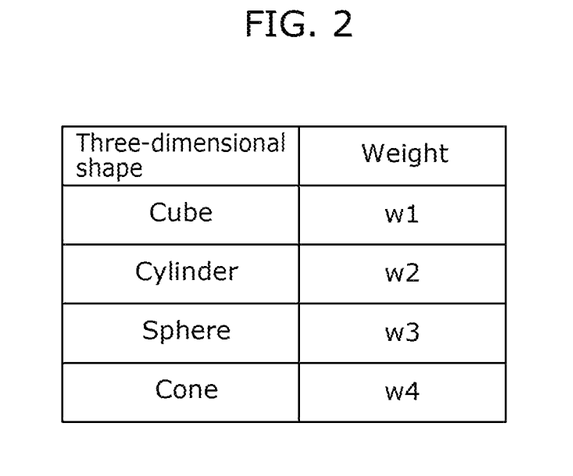
FIG. 2 is a table showing weights that are preliminarily associated with simple three-dimensional shapes.

FIG. 2 is a table showing weights that are preliminarily associated with the simple three-dimensional shapes.

Cube is associated with weight w1, cylinder is associated with weight w2 that is smaller than weight w1, sphere is associated with weight w3 that is smaller than weight w2, and cone is associated with weight w4 that is smaller than weight w3. When a second structure is formed of one cube, for example, calculator 103 determines weight w1 as the reflection index value of such second structure. Also, when a second structure is formed of a combination of one cylinder and two spheres, for example, calculator 103 determines a sum of weight w2 and weight w3×2 as the reflection index value of such second structure. Also, when a second structure is formed of a combination of four cones, for example, calculator 103 determines weight w4×4 as the reflection index value of such second structure.

Selector 104 selects one of the plurality of second structures, on the basis of a plurality of reflection index values that correspond one to one to the second structures. More specifically, selector 104 selects, as one second structure, the second structure whose reflection index value is the smallest among those of the plurality of second structures.

Decoder 105 performs decoding on an encoded audio stream, thereby decoding a first audio signal.

Space generator 106 replaces the first structure with the one second structure selected by selector 104, thereby generating a simplified space in which the three-dimensional shape of the first structure is simplified.

Renderer 107 calculates the arrival direction and the propagation distance through which sound arrives at the head portion of the listener, on the basis of the simplified space generated by space generator 106, the position and posture of the head portion of the listener, and the position of the sound source, where the sound is at least one of sound that arrives at the head portion from the sound source or sound that arrives at the head portion after reflected at one second structure in the simplified space. Subsequently, renderer 107 performs, on the first audio signal decoded by decoder 105, an operation for convolving the arrival direction and the propagation distance of the at least one sound to a predetermined head-related transfer function (HRTF). Through this, renderer 107 generates a second audio signal and outputs the generated second audio signal. Also, renderer 107 generates a video signal that represents the view seen from the listener from the listening position of the listener in the posture of the listener, on the basis of the space information and the position and posture of the head portion of the listener. The video signal is video showing a structure in the virtual space, included in such view, in which the structure is not simplified. Note that renderer 107 identifies the listening position of the listener in the virtual space, on the basis of the listener information received by communicator 108.

Communicator 108 communicates with terminal 200, thereby transmitting and receiving information to and from terminal 200. For example, communicator 108 transmits, to terminal 200, the second audio signal and the video signal that are output signals. Also, for example, communicator 108 receives, from terminal 200, the listener information indicating the position and posture of the head portion of the listener.

The following describes terminal 200.

Terminal 200 includes communicator 201, controller 202, detector 203, input receiver 204, display 205, and sound outputter 206. Terminal 200 may be, for example, a VR headset that is attached to the head portion of the user or may be a mobile terminal such as a smartphone attached to a placement instrument that is placed on the head portion of the user.

Communicator 201 communicates with information processing device 100 to transmit and receive information to and from information processing device 100. For example, communicator 201 transmits, to information processing device 100, the listener information indicating the position and posture of the head portion of the listener. Communicator 108 also receives, for example, a second audio signal and a video signal that are output signals, from information processing device 100.

Out of the second audio signal and the video signal received by communicator 201, controller 202 outputs the second audio signal to sound outputter 206 and outputs the video signal to display 205. Controller 202 also obtains a movement of the head portion of the user (i.e., a change in the position and posture of the head portion) detected by detector 203. Controller 202 also obtains an input received by input receiver 204. The input indicates that the position of the listener is to be moved and the posture of the listener is to be changed in the virtual space. Controller 202 generates listener information indicating the listening position of the listener and the posture of the head portion of the listener, on the basis of the obtained movement of the head portion of the user and the obtained input indicating that the position and posture of the head portion of the listener are to be changed. Controller 202 then transmits the generated listener information to information processing device 100 via communicator 201. Controller 202 obtains the movement of the head portion and the input, and sequentially performs processing of generating listener information on the basis of the obtained movement of the head portion and the obtained input (i.e., performs the processing at predetermined time intervals). The predetermined time intervals are, for example, time less than one second.

Detector 203 sequentially detects the movement of the head portion of the user. Detector 203 detects a change in the position and posture of the head portion of the user. Detector 203 includes, for example, an acceleration sensor and an angular rate sensor. Detector 203 is, for example, an inertial measurement unit (IMU).

Input receiver 204 receives, from controller 300 operated by the user, an input indicating that the position of the listener is to be moved and the posture of the head portion of the listener is to be changed in the virtual space. Input receiver 204 may receive the input from controller 300 by wirelessly communicating with controller 300 or by performing wired communication. Communicator 201 may have the function of input receiver 204 of receiving an input from controller 300. Input receiver 204 may include, for example, a button, a touch sensor, and so forth for directly receiving an input from the user.

Display 205 displays video (moving image) represented by the video signal outputted from controller 202. The moving image is video including a plurality of frames. The video may also be still images. Examples of display 205 include a liquid crystal display and an organic electroluminescence (EL) display.

Sound outputter 206 outputs sound represented by the audio signal outputted from controller 202 (including music). Sound outputter 206 is, for example, a speaker.

Controller 300 is a device that receives an input from the user and transmits the received input to terminal 200.

2. Operation

The following describes an operation performed by information processing device 100, that is, the information processing method performed by information processing device 100.

Figure 3:
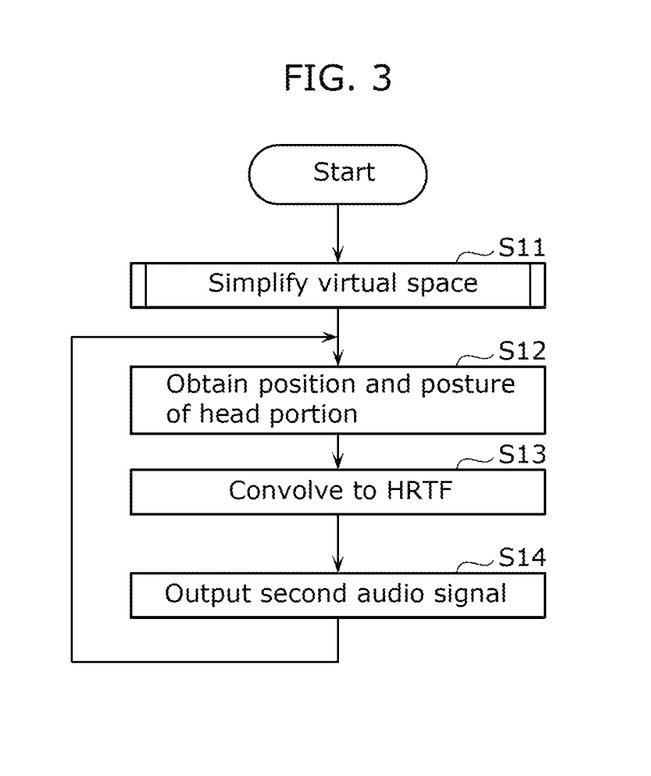
FIG. 3 is a flowchart showing an example operation performed by an information processing device.

FIG. 3 is a flowchart showing an example of the operation performed by the information processing device.

Information processing device 100 simplifies a virtual space included in space information (S11). The processing of simplifying a virtual space will be described in detail later.

Next, information processing device 100 obtains listener information that includes the position and posture of the head portion of the listener in the virtual space (S12).

Subsequently, information processing device 100 calculates the arrival direction and the propagation distance through which sound arrives at the head portion of the listener, on the basis of the simplified space generated by space generator 106, the position and posture of the head portion of the listener, and the position of the sound source, where the sound is at least one of sound that arrives at the head portion from the sound source or sound that arrives at the head portion after reflected at one second structure in the simplified space. Information processing device 100 then performs, on the decoded first audio signal, an operation for convolving the arrival direction and the propagation distance of the at least one sound to a predetermined head-related transfer function (HRTF), and generates a second audio signal (S13).

Subsequently, information processing device 100 outputs the generated second audio signal (S14).

Figure 4:
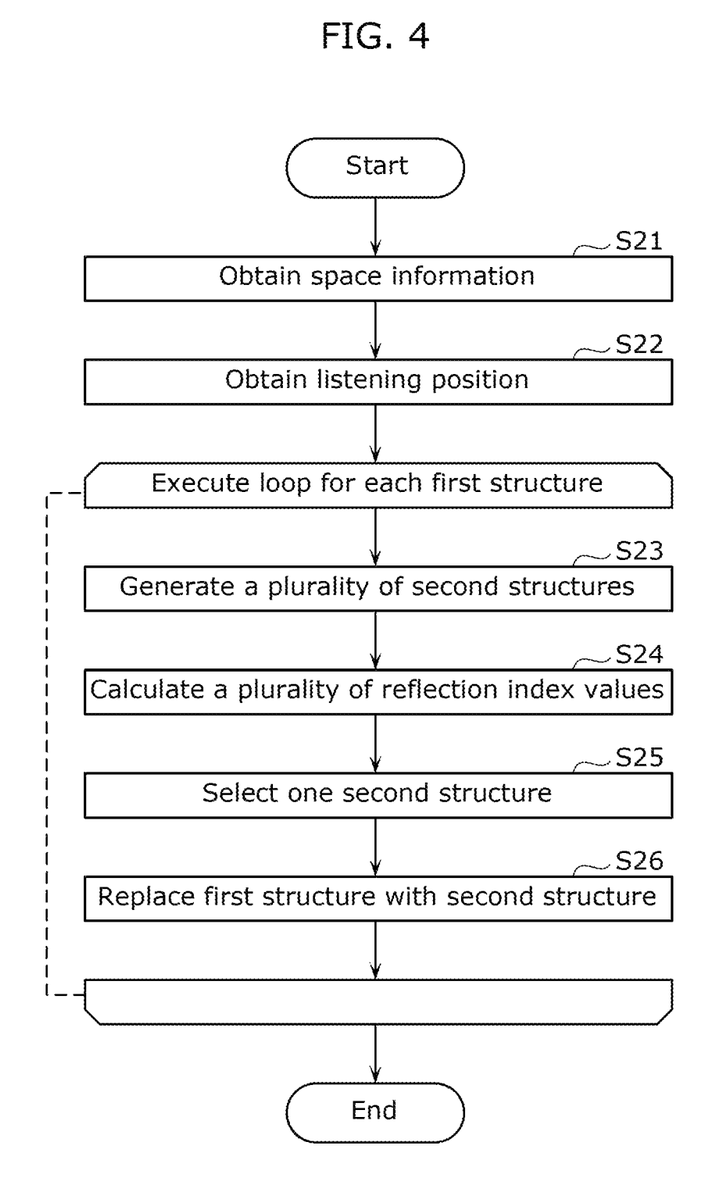
FIG. 4 is a flowchart showing an example of processing for simplifying a virtual space.

FIG. 4 is a flowchart showing an example of the processing of simplifying a virtual space.

Information processing device 100 obtains the space information (S21). The space information is information used to reproduce a virtual space. The virtual space includes a structure and a sound source located in the virtual space.

Information processing device 100 obtains the listening position of the listener in the virtual space (S22).

Next, information processing device 100 executes the loop that includes step S23 through step S26, for each of at least one first structure in the virtual space.

Information processing device 100 generates a plurality of second structures, each having a simplified shape for simplifying the shape of a target first structure to be processed (S23).

Information processing device 100 then calculates, for each of the plurality of second structures, a reflection index value relating to the sound reflection efficiency of the second structure, thereby calculating a plurality of reflection index values that correspond one to one to the second structures (S24).

Subsequently, information processing device 100 selects one of the plurality of second structures, on the basis of the plurality of reflection index value (S25).

Information processing device 100 replaces the first structure with the selected one second structure (S26).

Information processing device 100 ends the loop after performing step S23 through step S26 for each of one or more first structures. Through this, a simplified space is generated in which all of the first structures are replaced by second structures.

Note that information processing device 100 may not execute the foregoing loop so long as information processing device 100 is able to execute the processes of step S23 through step S26 for each of the one or more first structures in the virtual space.

Figure 5:
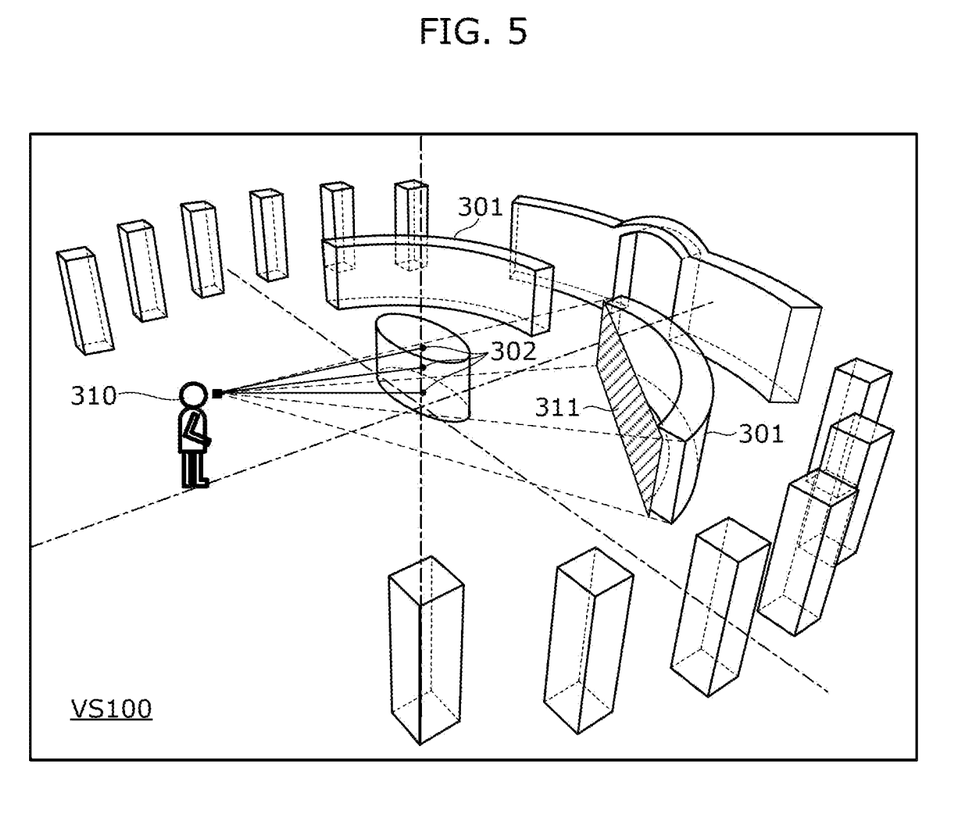
FIG. 5 is a diagram showing a specific example of the virtual space.

FIG. 5 is a diagram showing a specific example of the virtual space.

As shown in FIG. 5, virtual space VS100 includes a plurality of first structures 301, sound source 302, and listener 310. Information processing device 100 replaces first structures 301 having arc-like curvy shapes with second structures having simpler shapes. For example, information processing device 100 generates each of the plurality of second structures by combining one or more types of the simple three-dimensional shapes so that the second structure matches a projected area of projected shape 311 of first structure 301 in a plan view of first structure 301 seen from the listening position of listener 310. Example shapes of the plurality of second structures include a shape of 1 cube, a shape formed of a combination of 5 cylinders, a shape formed of a combination of 20 spheres, a shape formed of a combination of 10 cones, and so forth.

3. Effects

Information processing device 100 according to the present embodiment performs the information processing method described below. That is, information processing device 100 performs obtaining space information for reproducing a virtual space including a first structure and a sound source that are located in the virtual space. Information processing device 100 performs generating a plurality of second structures, each having a simplified shape for simplifying a shape of the first structure. Here, the simplified shape of each of the plurality of second structures has a shape formed of a combination of one or more types of a plurality of predetermined simple three-dimensional shapes. Information processing device 100 performs calculating a reflection index value of each of the plurality of second structures to calculate a plurality of reflection index values that correspond one to one to the plurality of second structures. Here, each of the reflection index values relates to a sound reflection efficiency of a corresponding one of the plurality of second structures. Information processing device 100 performs selecting one of the plurality of second structures, based on the plurality of reflection index values. Information processing device 100 performs replacing the first structure with the one of the plurality of second structures that is selected to generate a simplified space in which a three-dimensional shape of the first structure is simplified.

With this, the first structure located in the virtual space is replaced by one of the plurality of second structures that is selected on the basis of the reflection index values of the plurality of second structures that are generated by simplifying the shape of the first structure. This makes it possible to replace the first structure with the second structure having similar sound affecting properties and having a simplified shape. Consequently, it is possible to obtain a simplified space that involves a reduced amount of computation so that no change occurs in the sound affecting properties. This reduces the processing load on the reproduction of stereoacoustic sound.

Information processing device 100 further preforms identifying listening position of a listener in the virtual space. In the generating of the plurality of second structures, information processing device 100 performs generating the plurality of second structures by combining the one or more types of the plurality of simple three-dimensional shapes to cause each of the plurality of second structures to match a projected area of the first structure in a plan view of the first structure seen from the listening position.

This makes it possible to generate a plurality of second structures having similar sound affecting properties to those of the first structure.

Also, each of the plurality of second structures is generated to cause a sound reflection angle at each of three points relating to the second structure and a sound reflection angle at each of three points relating to the first structure to be equal to each other in a sound propagation path from the sound source to the listening position. Here, the three positions relating to the second structure are a barycenter position in a projected shape of the second structure in a plan view of the second structure seen from the listening position, and positions of two points that sandwich the barycenter position, and the three positions relating to the first structure are a barycenter position in a projected shape of the first structure in a plan view of the first structure seen from the listening position, and positions of two points that sandwich the barycenter position.

This makes it possible to generate a plurality of second structures having similar sound affecting properties to those of the first structure.

In the selecting of the one of the plurality of second structures, information processing device 100 performs selecting, as the one of the plurality of second structures, a second structure whose reflection index value is smallest among the reflection index values of the plurality of second structures.

This makes it possible to select, as one second structure, a structure that involves the smallest amount of computation among the plurality of second structures.

Also, information processing device 100 further performs the processing described below. That is, information processing device 100 identifies a position and a posture of a head portion of a listener in the virtual space. Information processing device 100 calculates an arrival direction and a propagation distance of sound, based on the simplified space, the position and the posture of the head portion, and a position of the sound source. Here, the sound is at least one of sound that arrives at the head portion from the sound source or sound that arrives at the head portion after reflected at the one of the plurality of second structures in the simplified space, and the propagation distance is a distance through which the at least one sound arrives at the head portion. Information processing device 100 generates an audio signal by convolving the arrival direction and the propagation distance of the at least one sound to a predetermined head-related transfer function. Information processing device 100 outputs the audio signal generated.

With this, stereoacoustic sound processing is performed, using a simplified space that involves a reduced amount of computation so that no change occurs in the sound affecting properties. This reduces the processing load on the reproduction of stereoacoustic sound.

Also, the position and the posture of the head portion and the position of the sound source are identified at a plurality of timings that are mutually different. The calculating of the propagation distance, the generating of the audio signal, and the outputting of the audio signal are performed at each of the plurality of timings.

With this, it is possible to reduce the processing load on the reproduction of stereoacoustic sound. This effectively reduces the processing load of the processing that is performed in real time.

Information processing device 100 includes, for example, a processor and memory, where the processor performs the foregoing processing using the memory.

Other Embodiments, Etc.

The present disclosure has been described above on the basis of the foregoing embodiment, but the present disclosure is certainly not limited to such embodiment. The present disclosure also includes the cases described below.

(1) Each of the devices described above may be more specifically a computer system that includes a microprocessor, a ROM, a RAM, a hard disk unit, a display unit, a keyboard, a mouse, and so forth. The RAM or the hard disk unit stores a computer program. By the microprocessor operating in accordance with such computer program, it is possible for each of the devices to accomplish its function. Here, the computer program includes a combination of a plurality of command codes indicating instructions to the computer to achieve a predetermined function.

(2) One or more, or all of the elements included in each of the devices in the foregoing embodiment may be implemented as a single system large scale integration (LSI). The system LSI is a super-multifunctional LSI that is manufactured by integrating a plurality of components onto a single chip. The system LSI is more specifically a computer system that includes a microprocessor, a ROM, a RAM, and so forth. The RAM stores a computer program. By the microprocessor operating in accordance with such computer program, it is possible for the system LSI to accomplish its function.

Also, each of the elements included in each of the foregoing devices may take the form of an individual chip, or one or more, or all of the elements may be encapsulated into a single chip.

Although LSI is described here as an example, such chips may be also referred to as ICs, LSIs, super LSIs, or ultra LSIs, depending on the degree of integration. Also, a technique of circuit integration is not limited to the implementation as an LSI. Each of the elements thus may be implemented as an exclusive circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

Furthermore, when a new technology of circuit integration that replaces LSI is available as a result of the progress in the semiconductor technology or other derivative technologies, such new technology may certainly be used to integrate the functional blocks. For example, application of biotechnology, etc. is possible.

(3) One or more, or all of the elements included in each of the foregoing devices may be implemented as a single module or an IC card removable from each of the devices. The module or the IC card is a computer system that includes a microprocessor, a ROM, a RAM, and so forth. The module or the IC card may include the foregoing super-multifunctional LSI. By the microprocessor operating in accordance with a computer program, it is possible for the module or the IC card to accomplish its function. Such module or the IC card may have tamper-resistance.

(4) The present disclosure may be the method described above. The present disclosure may also be a computer program that enables such method to be implemented using a computer, or digital signals that form the computer program.

The present disclosure may be something that is achieved by recording the computer program or the digital signals on a computer-readable recording medium such as a flexible disk, a hard disk, a CD-ROM, an MO, a DVD, a DVD-ROM, a DVD-RAM, a Blu-ray® disc (BD), and a semiconductor memory. The present disclosure may also be the digital signals recorded in such recording medium.

The present disclosure may be configured to transmit the computer program or the digital signals via, for example, a telecommunication line, a wireless or wired communication line, a network represented by the Internet, data broadcasting, and so forth.

The present disclosure may also be a computer system that includes a microprocessor and memory, where the memory stores the computer program and the microprocessor may operate in accordance with the computer program.

Also, the program or the digital signals may be recorded and transferred on the recording medium or transferred via, for example, the network to enable another independent computer system to carry out the present disclosure.

(5) The foregoing embodiment and variations may be combined with each other.

INDUSTRIAL APPLICABILITY

The present disclosure is applicable for use, for example, as an information processing method, an information processing device, and a recording medium that are capable of reducing processing load on the reproduction of stereoacoustic sound.

The invention claimed is:

1. An information processing method comprising:
obtaining sound information that includes (i) a first audio signal and (ii) space information that is information for reproducing a virtual space and includes first data relating to a first structure disposed in the virtual space, the virtual space including the first structure and a sound source;
generating second data based on the first data, each of the first data and the second data being associated with a position in the virtual space, the second data being data having a smaller amount of data than the first data;
calculating a propagation distance of sound from the sound source, the sound being reflected at the position associated with the second data and arriving at a position of a listener; and
generating a second audio signal subjected to stereoacoustic processing, using the first audio signal and the propagation distance.

2. The information processing method according to claim 1, further comprising:
selecting one of a plurality of second data, using information associated with each of the plurality of second data, the plurality of second data each being the second data.

3. The information processing method according to claim 2,
wherein the information associated with each of the plurality of second data includes a reflection index value related to a sound reflection efficiency, and
in the selecting, one of the plurality of second data is selected, based on the reflection index value.

4. The information processing method according to claim 3, further comprising:
generating a simplified space by replacing the first data with the one of the plurality of second data selected.

5. The information processing method according to claim 1,
wherein the second data is data indicating a second structure which is a structure generated by simplifying the first structure.

6. The information processing method according to claim 1,
wherein the second data comprises a plurality of second data that are data each being the second data and indicating a plurality of second structures, each being the second structure and having a shape formed by combining one or more types of three-dimensional shapes among a plurality of types of predetermined simple three-dimensional shapes.

7. The information processing method according to claim 6, further comprising:
identifying a listening position of the listener in the virtual space,
wherein each of the plurality of second structures is generated by combining the one or more types of the plurality of simple three-dimensional shapes to cause each of the plurality of second structures to match a projected area of the first structure in a plan view of the first structure seen from the listening position.

8. The information processing method according to claim 7,
wherein each of the plurality of second structures is generated to cause a sound reflection angle at each of three points relating to the second structure and a sound reflection angle at each of three points relating to the first structure to be equal to each other in a sound propagation path from the sound source to the listening position, the three positions relating to the second structure being a barycenter position in a projected shape of the second structure in a plan view of the second structure seen from the listening position, and positions of two points that sandwich the barycenter position, the three positions relating to the first structure being a barycenter position in a projected shape of the first structure in a plan view of the first structure seen from the listening position, and positions of two points that sandwich the barycenter position.

9. The information processing method according to claim 6,
wherein the plurality of second structures have mutually different shapes.

10. The information processing method according to claim 1, further comprising:
selecting one of a plurality of second data, using information associated with each of the plurality of second data that are data each being the second data and indicating a plurality of second structures, each being the second structure,
wherein each of the plurality of second structures has a shape formed by combining one or more types of three-dimensional shapes among a plurality of types of predetermined simple three-dimensional shapes, and
one of the plurality of second structures indicated by the one of the plurality of second data selected is a second structure whose reflection index value is smallest among the plurality of second structures.

11. The information processing method according to claim 1, further comprising:
identifying a position and a posture of a head portion of the listener in the virtual space,
wherein in the generating, the second audio signal is generated by convolving an arrival direction and a propagation distance of the sound to a predetermined head-related transfer function, using the stereoacoustic processing, and the information processing method further comprises:
outputting the second audio signal generated.

12. The information processing method according to claim 11,
wherein the position and the posture of the head portion and the position of the sound source are identified at a plurality of timings that are mutually different, and
the calculating of the propagation distance, the generating of the second audio signal, and the outputting of the second audio signal are performed at each of the plurality of timings.

13. A non-transitory computer-readable recording medium having recorded thereon a program for causing a computer to execute the information processing method according to claim 1.

14. An information processing device comprising:
a processor; and
memory,
wherein using the memory, the processor:
obtains sound information that includes (i) a first audio signal and (ii) space information that is information for reproducing a virtual space and includes first data relating to a first structure disposed in the virtual space, the virtual space including the first structure and a sound source;
generates second data based on the first data, each of the first data and the second data being associated with a position in the virtual space, the second data being data having a smaller amount of data than the first data;
calculates a propagation distance of sound from the sound source, the sound being reflected at the position associated with the second data and arriving at a position of a listener; and
generates a second audio signal subjected to stereoacoustic processing, using the first audio signal and the propagation distance.

\* \* \* \* \*